United States Patent

[11] 3,538,992

| | | |
|---|---|---|
| [72] | Inventor | Narottam Mohanlal Chauhan,<br>Vasant, Ghod Bunder Road, Vile Parla,<br>Bombay, India |
| [21] | Appl. No. | 685,412 |
| [22] | Filed | Nov. 24, 1967 |
| [45] | Patented | Nov. 10, 1970 |
| [32] | Priority | Nov. 24, 1966 |
| [33] | | Great Britain |
| [31] | | 52,604/66 |

[54] DEVICE FOR HANDLING DISCRETE LAMINAR ARTICLES
18 Claims, 3 Drawing Figs.

[52] U.S. Cl. .................................................. 198/35, 53/159
[51] Int. Cl. .................................................. B65f 35/30, B65g 57/00

[50] Field of Search ............................................ 198/35, 34; 214/7; 53/159

[56] References Cited
UNITED STATES PATENTS
1,582,820  4/1926  Hungerford .................. 214/7X
FOREIGN PATENTS
948,228  8/1956  Germany ...................... 198/35

Primary Examiner—Edward A. Sroka
Attorney—Beveridge & DeGrandi

ABSTRACT: The present invention relates to devices for handling discrete laminar articles e.g. biscuits. By the present invention a continuous supply of such articles may be separated into batches each containing a predetermined number of such articles and transferred to a further handling station, e.g. a packing station.

Patented Nov. 10, 1970
3,538,992
Sheet 1 of 2
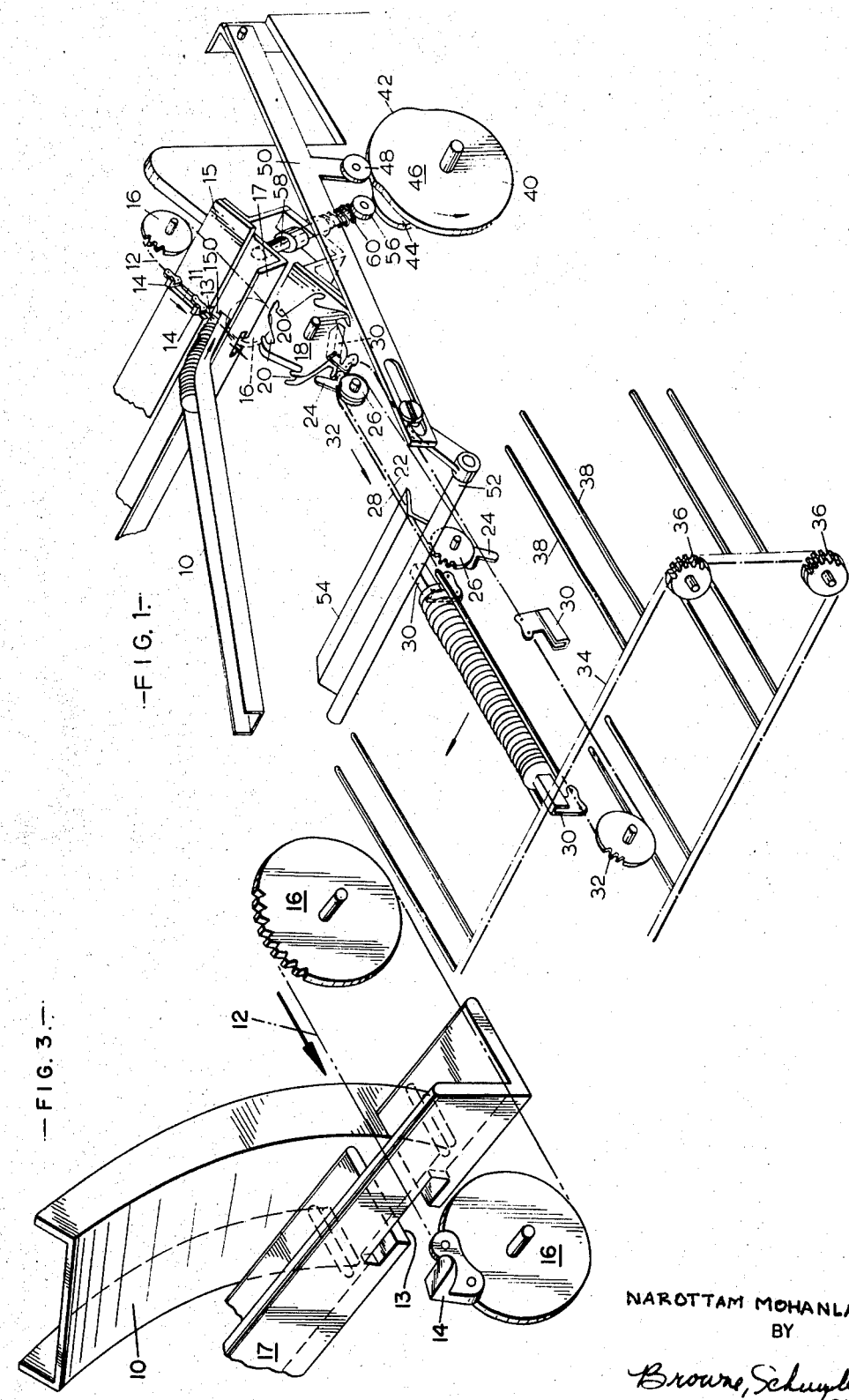
INVENTOR:
NAROTTAM MOHANLAL CHAUHAN
BY
Browne, Schuyler + Beveridge
Attorneys

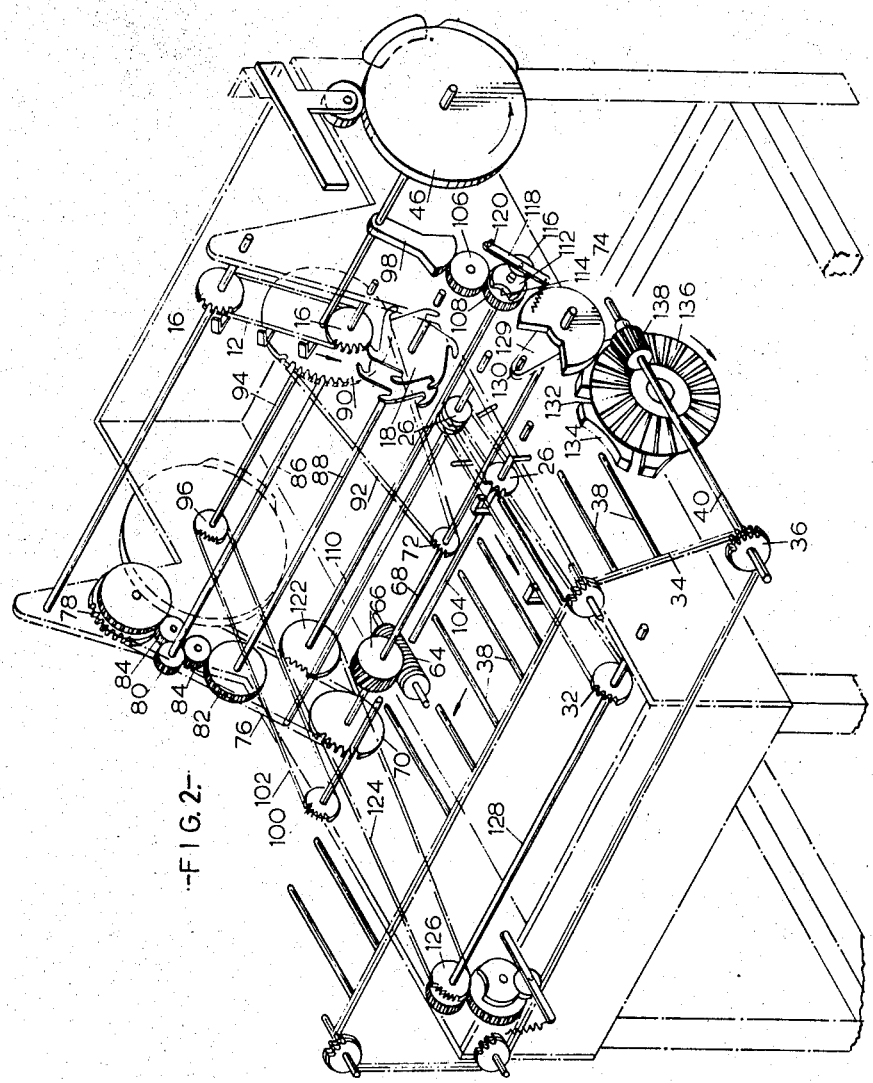

DEVICE FOR HANDLING DISCRETE LAMINAR ARTICLES

The present invention relates to a device for handling discrete laminar articles, e.g. biscuits.

In handling discrete laminar articles it is sometimes desirable to form a supply of such discrete articles into a batch, containing a fixed predetermined number of such articles and then to bodily move the batch of articles as a whole to a further handling station, storage position or the like.

According to the present invention there is provided a handling device which comprises a receiving station for receiving a supply of discrete laminar articles one by one, a support for the first of said articles, said support being continuously movable from said receiving station, whereby the first of said articles is supported at said receiving station and moved therefrom with said support to become a support for the next succeeding article received at said receiving station, a pair of transferring elements spaced apart by a distance substantially equal to the length of a predetermined number of said articles, one of said transferring elements being located at or near said receiving station, and said transferring elements being adapted to move in unison when the first of said articles reaches a position adjacent the other of said transferring elements, whereby to transfer said predetermined number of articles to a further handling or storage station.

Preferably said support comprises a finger mounted on a conveyor, e.g. a chain conveyor which is arranged for continuous movement. Preferably a number of such fingers are provided on said conveyor to enable continuous operation of the device.

The transferring elements may be in the form of a pair of fingers mounted on a conveyor, e.g. a chain conveyor, arranged for intermittent movement. Preferably more than one such pair of fingers is provided on said conveyor to enable continuous operation of the device.

In one preferred form of the invention each batch of articles is delivered by the transferring elements to a pocket on a further conveyor, which conveyor is arranged for intermittent movement to remove the batches of articles to a further handling or storage station, e.g. to a packing station. Said further conveyor is desirably arranged at an angle, e.g. 90°, to the direction of delivery of the articles thereto, so that the direction of travel of the articles is altered. Said pocket may be in the form of a pair of arms attached to said further conveyor, and it is desirable that a number of such pockets are provided to enable continuous operation of the device.

The intermittent movement of the further conveyor will of course be synchronized with the remainder of the device so that as soon as a batch of articles has been delivered to a pocket the conveyor moves to place an empty pocket in position to receive a further batch of articles.

The device of the invention is especially suitable for receiving biscuits and passing them on to a packing machine.

According to a further embodiment of the invention there is provided a device for handling discrete laminar articles comprising a chute for accommodating a supply of said articles, an endless conveyor provided with pushers to remove at least the leading article from the chute and to transfer said article to an arrangement for assembling a predetermined number of said articles into a batch from whence said batch of articles may be transferred to at least one further handling station, and means for separating said pusher from said supply of articles when said predetermined number of articles has been removed from said chute.

The separating means preferably comprises an arrangement, e.g. a cam arrangement for raising said articles on said chute out of the path of said pushers.

The device of the invention may be used in combination with the invention described in copending U.S. Pat. application Ser. No. 685,502, filed Nov. 24, 1967, now abandoned.

The present invention will now be described by way of example with reference to the accompanying drawings in which:

FIG. 1 shows a portion of a biscuit-handling machine incorporating one form of the present invention;

FIG. 2 shows the drive to the various parts of the machinery shown in FIG. 1; and FIG. 3 is an enlarged showing of the infeed.

Referring to the drawings the machine shown is a machine for dividing a supply of biscuits into batches ready for packaging. A chute 10 for accommodating a supply of biscuits delivered for instance from a baking oven, leads to an inclined chain conveyor 12 to which are attached a number of fingers 14. The conveyor 12 passes over two chain sprockets 16, 16 and is arranged to be continuously driven, the fingers 14 projecting through and passing along slots 11, 13 formed in biscuit-supporting plate 15 and angle iron 17 respectively. At the lower end of conveyor 12 a stacker wheel 18 is provided having biscuit-receiving slots 20 provided therein. Beneath the stacker wheel 18 and in a position to receive biscuits from the slots 20 is a chain conveyor 22 upon which are mounted a number of fingers 24. The conveyor 22 is mounted on a pair of chain sprockets 26, 26 and is arranged to be continuously and slowly driven. In juxtaposition to the chain conveyor 22 and extending beyond the conveyor 22 is a further chain conveyor 28 upon which are mounted a number of pairs of fingers 30. The fingers 30 in each pair of fingers are spaced by a distance equal to the length of a batch of biscuits. The conveyor 28 is arranged to be driven through a pair of chain sprockets 32, the drive being intermittent. A further chain conveyor 34, arranged with its direction of travel transverse to the travel of conveyor 28, is arranged to be intermittently driven by a number of chain sprockets 36. A number of arms 38, arranged in pairs, are attached to conveyor 34 and are arranged so as to receive a batch of biscuits from the fingers 30 and convey them in a direction transverse to their direction of travel between fingers 30.

A cam 40 is provided having a fixed land or a main body portion 42 and a removable land 44. The land 44 is attached to the main body portion 46 of the cam by means of bolts (not shown) or similar means and can easily be removed and replaced. The main body portion 42 cooperates with a cam follower 48 attached to a lever 50 which in turn is pivotably connected to a bar 52 to which is attached on angle iron 54. When lever 50 is raised by means of the land 42, the pivotal connection between lever 50 and bar 52 causes angle iron 54 to be swung downwardly to hold the rear of a batch of biscuits in an upright position. The removable land 44 is arranged for cooperation with cam follower 56, attached to rod 58, the cam follower 56 being biased into engagement with the cam 40 by means of spring 60. The upper end of the rod 58 is arranged to contact angle iron 17 whereby this angle iron may be raised and lowered in response to the profile of the cam. Raising the angle iron 17 raises the supply of biscuits above the path of the fingers 14 thus cutting off the supply of biscuits to the stacker wheel.

The drive for the various parts of the machinery is shown in FIG. 2. The machine is mounted on a framework F (shown in chain-dotted line). A common drive is taken from a motor (not shown) by a worm 64 which cooperates with a worm wheel 66, mounted on a shaft 68 which is rotatably mounted on the framework F. Also mounted on shaft 68 are gearwheels 70, 72 and a follower 74. A drive is taken framework means of chain 76 from chain sprocket 70 to chain sprocket 78 which in turn drives gearwheels 80 and 82 through idle spur gears 84. Gearwheel 80 is mounted on a shaft 86, rotatably mounted on the framework F. Shaft 86 also carries one of the chain sprockets 16 which drives the conveyor 12. Gearwheel stacker wheel 18 for rotation therewith, shaft 88 being rotatably mounted on framework F. Chain sprocket 72 drives a further chain sprocket 90 by means of a chain drive 92. The chain sprocket 90 is mounted on a shaft 94, rotatably carried by framework F, and also carries chain sprocket 96, spur gear sector 98 and cam 46 for rotation therewith. Chain sprocket 96 drives chain sprocket 100 via chain drive 102. The chain sprocket 100 is mounted on a shaft 104, which is rotatably carried by the frame work F and which carries one of chain sprockets 26 for rotation therewith. Spur gear sector 98 is arranged for cooperation with idle spur gear 106 whereby rotation of spur gear sector 98 about shaft 94 causes intermittent rotation of idle spur gear 106, which in turn causes intermittent rotation of spur gear 108 which is mounted on a shaft 110. Shaft 110 is rotatably carried by the frame work F. Attached to spur gear 108 is a circular disc 112 having two segments 114 removed therefrom. A disc 116, mounted on a lever 118, which is pivotally attached to framework F at 120, is arranged for cooperation with the sectors 114. The lever 118 is spring biased towards the disc 112. This arrangement thus locates the gearwheel 108 after each movement in its intermittent rotation. The intermittent motion of gearwheel 108 is transferred by shaft 110 to chain sprocket 122 which is mounted on shaft 110 for rotation therewith. Drive is transferred from chain sprocket 122 by chain drive 124 to chain sprocket 126 which in turn transfers the drive via shaft 128 to chain sprocket 32 thus imparting the intermittent motion to the conveyor 28.

Follower 74 is provided with a follower arm 129 which has attached thereto and follower finger 130 which cooperates with slots 132 formed in a cooperating geneva wheel 134. Geneva wheel 134 is attached to a bevel gear 136 which cooperates with bevel gear 138 to rotate shaft 140. Chain sprockets 36 are mounted on shaft 140 for rotation therewith and drive the conveyor 34 to which the arms 38 are attached.

In operation, a supply of biscuits is fed to or placed manually on chute 10 and falls to the bottom of the chute 10 under gravity. The biscuits are maintained in the chute 10 by projecting portions 150 of the angle member 17. Fingers 14 continuously pass the base of the chute 10 and in passing the chute 10 remove a biscuit from the bottom of the stack. Biscuits so removed are deposited one in each of the slots 20 formed in stacker wheel 18. Stacker wheel 18 transfers the biscuits onto conveyor 22. The first biscuit transferred to the conveyor is arranged to rest against one of fingers 24 to maintain it in an upright condition. The finger 24 is continuously driven at a speed such that each of the biscuits deposited on the conveyor 22 from the stacker wheel 18 rests against the previous biscuit placed on the conveyor 22. By the time the correct number (i.e. to form a batch ready for packaging) of biscuits have been removed from the chute 10, the cam 40 will be in a position such that the land 44 will cooperate with the cam follower 56 to raise shaft 58 thus raising angle iron 17 to cut off the supply of biscuits to the fingers 14. By the time the last biscuit in the batch has been passed to the conveyor 22, the cam 40 will have rotated to a position in which the land 42 raises the lever 50 thus causing the angle 54 to rest against the rear biscuit in the stack thus maintaining it in an upright condition. Immediately thereafter spur sector 98 will be in a position to transmit drive to conveyor 28 carrying fingers 30, which are spaced apart by a distance equal to the length of a batch of biscuits. The gearing of the drive to the conveyor 28 is such that its speed is rapid compared to the speed of conveyor 22. The batch of biscuits is thus quickly carried by a pair of fingers 30 and deposited between a pair of the arms 38 attached to the conveyor 34. The drive to the conveyor 34 is arranged such that immediately the stack of biscuits is between arms 38 and conveyor moves the next pair of arms 38 into a position to receive a further batch of biscuits. The batch of biscuits already between the pair of arms 38 is then moved intermittently to the packaging machine (not shown).

The arrangement shown in the drawings will be known as PARLE'S COUNTING SYSTEM.

I claim:

1. Article-handling apparatus comprising in combination, a receiving station for receiving a supply of discrete articles one by one, support means continuously movable from said receiving station for supporting the first of said articles such that the first of said articles is supported at said receiving station and moved therefrom with said support means to become a support for the next succeeding article received at said receiving station, means including a first transferring element located adjacent said receiving station, means including a second transferring element spaced from said first transferring element by a distance substantially equal to the length of a predetermined number of said articles to form a pair of spaced transferring elements, means for moving said transferring elements in unison when the first of said articles reaches a position adjacent the other of said transferring elements for transferring said predetermined number of articles to a further station.

2. Article-handling apparatus defined in claim 1 further including a conveyor and wherein said support means includes a finger mounted on said conveyor for continuous movement with said conveyer.

3. Article-handling apparatus defined in claim 1 further including a conveyor and means for moving said conveyor intermittently, and wherein said transferring elements comprise a pair of fingers mounted on said conveyor for movement therewith.

4. Article-handling apparatus defined in claim 1 further including a conveyor having means defining a pocket for receiving a batch of articles from said transfer elements to move the batch of articles to a further station, and means for moving said conveyer intermittently.

5. Article-handling apparatus defined in claim 4 wherein said conveyer includes a plurality of means defining a plurality of pockets for receiving a batch of articles from the transfer elements.

6. Article-handling apparatus defined in claim 1 further including conveyer means for conveying said predetermined number of articles from said transferring elements to a further station.

7. A device for handling discrete laminar articles comprising a chute for accommodating a supply of said articles, an endless conveyor provided with pushers to remove at least the leading article from the chute and to transfer said article to an arrangement for assembling a predetermined number of said articles into a batch, from whence said batch of articles may be transferred to at least one further handling station, and means for separating said pushers from said supply of articles when said predetermined number of articles has been removed from said chute.

8. A device according to claim 7 wherein said assembling arrangement includes a receiving station for successively receiving articles, support means continuously movable from said receiving station for supporting the first of said articles such that the first of said articles are supported at said receiving station and moved therefrom with said support means to become a support for the next succeeding article received at said receiving station, means including a first transferring element adjacent said receiving station, means including a second transferring element spaced from said first transferring element by a distance substantially equal to the length of a predetermined number of said articles to form a pair of spaced transferring elements, and means for moving said transferring elements in unison when the first of said articles reaches a position adjacent the other of said transferring elements for transferring said predetermined number of articles to a further station.

9. A device according to claim 7, wherein said separating means comprises an arrangement for raising said articles on said chute out of the path of said pusher.

10. An article-handling device according to claim 9 wherein a number of said fingers are provided on said conveyor.

11. An article-handling device according to claim 9 wherein said conveyor comprises a chain conveyor.

12. A device according to claim 7, wherein said separating means is operated by a cam arrangement.

13. A device according to claim 12, wherein said cam arrangement includes a removable land.

14. An article-handling device according to claim 13, wherein said conveyor is arranged at an angle to the direction of delivery of the articles thereto, so that the direction of travel of the articles is altered.

15. An article-handling device according to claim 14, wherein said angle is approximately 90°.

16. An article-handling device according to claim 15 wherein said pocket is in the form of a pair of arms attached to said further conveyor.

17. An article-handling device according to claim 12 wherein more than one pair of fingers is provided on said conveyor to enable continuous operation of the device.

18. An article-handling device according to claim 12, wherein said conveyor is a chain conveyor.